United States Patent [19]

Katz et al.

[11] 4,088,794

[45] May 9, 1978

[54] PROCESS FOR PRODUCING COFFEE EXTRACT

[75] Inventors: Saul N. Katz, Monsey, N.Y.; Martin Gottesman, Paramus, N.J.; Mateo Haya, New York, N.Y.

[73] Assignee: General Foods Corporation, White Plains, N.Y.

[21] Appl. No.: 801,135

[22] Filed: May 27, 1977

Related U.S. Application Data

[63] Continuation of Ser. No. 404,948, Oct. 10, 1973, abandoned.

[51] Int. Cl.² ............................................... A23F 1/08
[52] U.S. Cl. ..................................... 426/434; 426/432
[58] Field of Search .............................. 426/425–434, 426/594, 595; 23/270 R, 270.5 R, 272 R, 272.5

[56] References Cited

U.S. PATENT DOCUMENTS

| 2,915,403 | 12/1959 | Clinton et al. | 426/434 |
| 2,949,364 | 8/1960 | Belenker | 426/434 |
| 3,089,772 | 5/1963 | Bowden et al. | 426/434 |
| 3,656,964 | 4/1972 | Mansky et al. | 426/434 |
| 3,671,262 | 6/1972 | Wolfson et al. | 426/428 |

OTHER PUBLICATIONS

"Coffee Processing Technology", vol. I, Sivetz et al., Avi Publ. Co.: Westport, Conn., pp. 358, 359, 365, 370.
Kirk–Othmer Encyclopedia of Chemical Technology, 2nd Ed., vol. 5, pp. 758–760.

*Primary Examiner*—Joseph M. Golian
*Attorney, Agent, or Firm*—Thomas R. Savoie; Bruno P. Struzzi

[57] ABSTRACT

A high quality coffee extract is prepared using a commercial percolation system utilizing a superficial velocity of aqueous extraction liquid past the roasted and ground coffee of at least about 0.50 ft/min in the fresh stage extraction column of a percolator set.

9 Claims, No Drawings

PROCESS FOR PRODUCING COFFEE EXTRACT

This is a continuation, of application Ser. No. 404,948, filed 10/10/73 and now abandoned.

BACKGROUND OF THE INVENTION

This invention relates to coffee and more particularly to the production of a high quality coffee extract.

The commercial manufacture of coffee extract is achieved via the well-known process of percolation. Percolation is the semi-continuous, counter-current extraction of soluble coffee solids from roasted and ground coffee with an aqueous extraction liquid. A percolator set, generally comprised of from 4 to 8 extraction columns is normally employed in such a process.

At steady-state operation, the extraction columns of the percolator set contain roasted and ground coffee of varying degrees of extraction. The most extracted coffee is contained in the "spent stage" extraction column and the roasted and ground coffee in successive columns is progressively less extracted (fresher). The least extracted coffee, generally fresh or unextracted roasted and ground coffee, is contained in the "fresh stage" extraction column.

Aqueous extraction liquid, generally water, is heated and fed continuously to and through the spent stage extraction column. The aqueous extraction liquid initially solubilizes the soluble coffee solids contained in the roasted and ground coffee and then extracts these solids from the coffee bed. The aqueous extraction liquid exiting the spent stage, now containing a minor amount of soluble coffee solids, is then passed to and through the next successive extraction column in the percolator set, containing the next most extracted coffee, extracts soluble solids therefrom and is then passed through the next successive extraction column. In like manner the aqueous extraction liquid passes through the remaining extraction columns contacting the progressively fresher coffee contained therein, the aqueous extraction liquid thereby becoming more highly concentrated in soluble coffee solids.

After passing through the extraction column containing the least extracted coffee (the fresh stage), a predetermined portion of the aqueous extraction liquid is drawn off from the fresh stage as coffee extract. This coffee extract is then further processed to produce a soluble coffee product.

To begin a new cycle, the spent stage extraction column is taken off-stream and aqueous extraction liquid is fed to the spent stage for this cycle, the roasted and ground coffee contained therein being the next most extracted coffee from the previous cycle, and the extraction liquid is passed through the successive extraction columns contacting the progressively fresher coffee contained therein and extracting soluble solids therefrom. An extraction column containing freshly roasted and ground coffee is placed on-stream thus becoming the fresh stage for coffee extract draw-off for this cycle.

In like manner, successive cycles are continued. A given bed of roasted and ground coffee, therefore, becomes progressively more extracted in each succeeding cycle as it moves in a batch manner counter-current to the continuous flow of extraction liquid.

A unique feature of coffee percolation is the desirability of preserving to the highest possible degree the characteristic flavor and aroma of roasted and ground coffee. As in nearly all extraction operations, economic considerations make it desirable to maximize the yield of soluble coffee solids obtained from a given charge of roasted and ground coffee. Similarly, it is desirable to obtain economical concentrations of soluble coffee solids in the drawn-off coffee extract so as to lessen the water removal requirements needed during drying to a final soluble coffee product. However, these economic considerations must necessarily be balanced against the desire to obtain a flavorful coffee extract similar to that obtained when roasted and ground coffee is home-brewed. Thus, typical extraction techniques such as high temperature processing, while effective in obtaining relatively high yields, have a pronounced detrimental effect on the delicate flavor and aroma components of coffee.

It is common in the coffee industry today to compromise those objectives by resorting to relatively high temperature treatment in the spent stage and the next few successive stages to generate autoclaved or hydrolyzed coffee solids to improve the overall yield of the extraction process. The extraction liquid is then cooled (through either natural cooling or suitable heat exchange apparatus) before contacting the coffee in the fresher stages of the percolator set. While effective in producing economical yields it is still found that the resulting coffee extract drawn off from the fresh stage is somewhat lacking in the characteristic flavor of home-brewed roasted and ground coffee. More particularly, it is extremely desirable to achieve highly efficient extraction of soluble coffee solids in the fresher stages since these columns contain the roasted and ground coffee having the most flavorful and aromatic coffee solids. If these coffees are inefficiently extracted, they will be subjected to more severe extraction conditions as they move "back" in the percolator set (i.e., as they become progressively more extracted in succeeding cycles). The result is that valuable, flavorful coffee solids are lost through degradation. The resulting coffee extract, while produced at economical yield and concentrations, may therefore still be lacking in high quality flavor and aroma notes.

It is accordingly the primary object of this invention to produce a high quality coffee extract at commercially economical yields and concentrations.

This and other objects will become more apparent upon reading the specification and claims which follow.

SUMMARY OF THE INVENTION

It has been discovered that a high quality coffee extract can be obtained at commercially acceptable yields and concentrations by utilizing a superficial extraction liquid velocity past the roasted and ground coffee in the fresh stage extraction column of at least about 0.50 ft/min and preferably between about 0.70 ft/min and 1.2 ft/min.

In our copending application entitled "Process for Producing Coffee Extract", Ser. No. 404,947 filed Oct. 10, 1973, and now abandoned, there is disclosed an extraction process wherein a high quality coffee extract is produced at economical yields and soluble solids concentrations by utilizing high extraction liquid velocities in the extraction columns of the percolator set. It is found that in maintaining such velocities throughout the percolator set, pressure drops are encountered across the set which may hamper efficient operation. More particularly, high velocities in the spent stages of the percolator set, i.e., the extraction columns containing roasted and ground coffee which has already undergone a series of extractions in previous cycles, may cause undesirable pressure problems due to the compressed nature of these wetted coffees.

This invention is predicated on the unexpected finding that by utilizing an extraction liquid superficial velocity of at least about 0.50 ft/min in less than all the extraction columns but including the fresh stage extraction column of the percolator set, a high quality coffee extract is obtained at excellent yields and concentrations. By virtue of this invention, significant pressure drops across the columns are avoided.

Specifically, we have found that a high quality coffee extract can be prepared by utilizing these high extraction liquid velocities in the fresh stage extraction column only or in the fresh stage extraction column together with all or some of the remaining extraction columns comprising the "fresh" section of the percolator set as will be described in more detail hereinafter.

A variety of methods may be employed to achieve the high extraction liquid velocities of this invention. In particular, where it is desired to utilize high extraction liquid superficial velocities in the fresh stage extraction column only we have found that recycling a portion of the coffee extract drawn off from the fresh stage extraction column to be most preferred.

In the context of this invention, the coffee extracted may be either decaffeinated or undecaffeinated coffee and may either be a blend of coffee varieties or a single coffee variety.

The superficial velocity of aqueous extraction liquid past the roasted and ground coffee as used in this invention is defined as the ft$^3$/min of extraction liquid divided by the ft$^2$ extractor area.

DETAILED DESCRIPTION OF THE INVENTION

According to the process of this invention, roasted and ground coffee contained in the extraction columns of a percolator set is countercurrently contacted with an aqueous extraction liquid to produce a coffee extract. The extraction liquid, which is generally water but may also be a dilute solution of solids such as soluble coffee or salts, is generally heated to between 250° F to 350° F and fed continuously to the spent stage extraction column containing the most spent or most extracted coffees in the percolator set for this cycle. The extraction liquid is then passed through successive extraction columns in the set containing progressively fresher or less extracted roasted and ground coffee extracting soluble coffee solids therefrom. After passing through the fresh stage extraction column containing the freshest (least extracted) roasted and ground in the set for this cycle, a portion of the extraction liquid is drawn off therefrom as coffee extract and further processed to produce a soluble coffee powder.

The key to the present invention resides in utilizing a superficial velocity of aqueous extraction liquid past the roasted and ground coffee of at least about 0.50 ft/min in the fresh stage extraction column. Preferably, the velocity will be greater than about 0.65 ft/min. Upper limits on the extraction liquid velocity in the fresh stage are generally dictated by the appearance of significant pressure problems occassioned thereby. However, a distinct advantage of this invention is that by utilizing high extraction liquid velocities in the fresh stage extraction column only, pressure problems are nearly eliminated, and alternatively, higher velocities can be achieved before significant pressure drops are realized. Because of the fact that the coffee in the fresh stage is relatively unextracted and therefore not as tightly compressed as more wetted coffees, pressure drops across the fresh stage extraction column do not become troublesome at the extraction liquid velocities of this invention. More importantly, however, where high velocities are utilized in the fresh stage only, pressure drops across the remaining extraction columns in the set are no more than those normally encountered in standard percolation processing. In general, the extraction liquid velocities in the fresh stage will not exceed about 1.2 to 1.4 ft/min.

As disclosed in our previously referred to concurrently filed application, the utilization of high extraction liquid velocities throughout the percolator set results in an excellent quality coffee extract at commercially feasible yields and concentrations. As will be discussed hereinafter, these results are attributable to a more positive movement of coffee solids in the percolator set. That is, soluble coffee solids are more efficiently generated and/or recovered in the fresher stages of the percolator set containing the more flavorful and aromatic coffees. This improved extraction results in fewer of these flavorful solids being subjected to the more intensive heat treatment the coffee bed (and hence these solubles) experience as it moves "back" in the percolator set in subsequent cycles. The key to the present invention is the discovery that similar solids movement and flavor benefits are obtainable merely by utilizing high extraction liquid velocities in the fresh stage extraction column either alone or in conjunction with such valocities in all or some of the remaining columns in the "fresh" section of the percolator set.

Thus, in actual operation, where high extraction liquid superficial velocities past the roasted and ground coffee are utilized in the fresh stage extraction column only, the percolator set is operated at normal percolation conditions, i.e., extraction liquid velocities ranging up to about 0.40 ft/min until the extraction liquid is passed to the fresh stage extraction column at which point the extraction liquid velocity past the roasted and ground coffee is increased to at least about 0.50 ft/min and preferably between 0.65 and 1.2 ft/min. For example, an auxiliary pumping system may be employed to increase the velocity or internal recirculation of extraction liquid can be used.

It is found that at the extraction liquid velocities of this invention a more "plug-flow" type arrangement is utilized in the fresh stage extraction column. We have found that such operation results in a more efficient solubilization and recovery of soluble coffee solids in the fresh stage. As noted previously, the net effect of such operation is that fewer of the flavorful coffee solids move back in the percolator set in subsequent cycles where they are exposed to temperature degradation.

Our most preferred means of achieving the high extraction liquid velocities of this invention in the fresh stage is by recycling a portion of the coffee extract drawn off from the fresh stage back to the entrance of the fresh stage. Thus in a given cycle as coffee extract is drawn off from the fresh stage it will be drawn to a suitable holding tank from which a portion can be recycled through the system. Preferably, however, the coffee extract is drawn-off to separate holding tanks, one being for the extract to be recycled, the other for holding the coffee extract which is to be further processed to soluble coffee powder.

Thus, in a given cycle a portion of the coffee extract taken off the fresh stage is fed to some suitable holding vessel for recycling. In the next successive cycle, as the aqueous extraction liquid exits the next freshest extraction column in the percolator set, it is combined with the portion of coffee extract held from the previous draw-off and then fed to the fresh stage extraction column. This larger extraction liquid throughput, at a constant cycle time, results in the increased velocity in the fresh stage extraction column. The amount of drawn off coffee extract which is to be recycled in combination with the normal extraction liquid flow through the fresh stage in order to achieve any given velocity is easily calculated.

The portion of drawn-off coffee extracted recycled through the fresh stage may be either a first portion of coffee extract drawn off or some intermediate or latter portion.

Operation in this preferred manner has been found to result in a coffee extract of extremely good quality at commercial yields and concentrations. These beneficial effects of recycling are in fact somewhat unexpected based on prior experience. The driving force for coffee solids extraction is mainly the concentration gradient between soluble solids in the extraction liquid and those in the coffee bed. By recycling a portion of the drawn off coffee extract, now more heavily laden with soluble solids by virtue of it having been already passed through a fresh stage in the previous cycle, the resultant concentration gradient existing in the extraction column is correspondingly lessened and the driving force decreases. However, we have found that this disadvantage is overcome by utilization of the high extraction liquid velocities of this invention. The more turbulent plug-flow results in improved extraction and recovery of soluble solids notwithstanding the decreased driving force. Further, it is believed that the more turbulent flow tends to break down stagnant boundary layers within the extraction column thereby minimizing resistance to the diffusion of coffee solids to the surrounding extraction liquid.

Examples of alternate means for achieving the high extraction liquid velocities of this invention in the fresh stage extraction column include internal recirculation of the extraction liquid which the column or utilization of a larger liquid throughput through the fresh stage extraction column. In connection with the latter, coffee extract recycle falls within this category. Alternatively, however, a separate water stream can be directed to the fresh stage in conjunction with the extraction liquid exiting the next freshest stage. This will result, of course, in a more dilute coffee extract being drawn off from the fresh stage and hence larger water removal requirements during drying. This economical disadvantage, however, may be justified in many instances by the high quality coffee extract produced.

In an alternate embodiment of this invention, extraction liquid superficial velocities past the roasted and ground coffee are utilized in the fresh stage extraction column together with all or some of the remaining extraction columns in the "fresh" section of the percolator set. In percolation practice it is common to refer to the entire percolator set as being comprised of a fresh or atmospheric section and an autoclave or hydrolysis or spent section. While not physically separated the sections are characterized primarily on the basis of the extraction operation taking place in the extraction columns which make up the particular section. Thus in the spent or autoclave section the roasted and ground coffee is subjected to temperature and pressure conditions such that the predominant operation is the generation of hydrolysis products. In the fresh section of the set the conditions are maintained such that the roasted and ground coffees contained therein primarily undergo extraction of their soluble coffee solids at near atmospheric pressure and relatively lower temperature to preserve the flavor and aroma characteristics of these solids. In general, the distinguishing characteristic which serves to separate the fresh section from the spent section is temperature. Thus an extraction column is said to be in the fresh section if the average temperature existing therein is less than about 250° F. For a 5 column percolator set this will generally include at least the fresh stage extraction column and the next freshest stage.

Thus, in this embodiment extraction liquid velocities of at least about 0.50 ft/min are utilized in the fresh stage extraction column and all or some of the remaining extraction columns in the fresh section of the percolator set. For example, if the percolator set comprises 6 extraction columns of which the last three columns are in the fresh section, the high extraction liquid velocities of this invention are utilized in the fresh stage extraction column and either the next freshest stage or both the next freshest stage and the stage preceeding that.

By operating in this manner it is found that a high quality coffee extract is produced without encountering excessive undesirable pressure drops. As discussed with respect to the utilization of high velocities in the fresh stage only, the less wetted and extracted nature of the coffees contained in the fresh section make them less compressible and therefore less resistant to the high velocity extraction liquid flow of this invention.

To obtain the high extraction liquid velocities in this embodiment, a recycle of a portion of the extraction liquid drawn off from a particular extraction column in the fresh section may be utilized as described above with respect to high velocities in the fresh stage only. Alternatively, internal recirculation of extraction liquid may be employed in each column in which high velocity liquid flow is utilized. Another method is to add feed water just before the aqueous extraction liquid enters the first column in which high extraction liquid velocities are to be utilized.

In connection with this embodiment of this invention, i.e., utilization of extraction liquid velocities of at least 0.50 ft/min in the extraction columns of the fresh section, the percolator set may be physically separated in the well-known process of split-percolation. As before, the percolator set is divided into a spent section and a fresh section. However, in this process a separate feed stream and a separate draw-off are utilized in the spent section and a separate feed and draw-off are used in the fresh section. Thus, in this embodiment, normal percolation conditions designed to generate predominantly hydrolysis products are utilized in the spent section and a draw-off is taken from the last extraction column in this section. A separate feed stream, i.e., water is fed to the fresh section and a draw-off is taken from the last extraction column in this section, the fresh stage extraction column for the entire percolator set. Operation in this manner allows the utilization of the high extraction liquid velocities of this invention in the fresh section extraction columns without the need for recycling, etc.

Thus the feed may be passed through the fresh section at rates different to produce the high velocities of this invention (resulting in a shorter cycle time for a constant cross-sectional area of flow) or a larger feed liquid throughput may be employed (which will result in a somewhat more dilute draw-off from the fresh stage extraction column).

The draw-off from the fresh section and from the spent section may then be combined either before or after drying to produce a dry reconstitutable soluble coffee product.

Thus the present invention is predicated on the utilization of extraction liquid velocities of at least about 0.50 ft/min and preferably between about 0.65 and 1.2 ft/min in the fresh stage extraction column to achieve a high quality coffee extract without encountering troublesome pressure problems. Alternate embodiments include utilization of such velocities either in the fresh stage extraction column only with velocities below 0.50 ft/min in the remaining extraction columns of the percolator set; or utilization of such velocities in the fresh stage extraction column and all or some of the remaining extraction columns of the percolator set, preferably those in the fresh section.

In the process of this invention, in order to preserve the beneficial effects of achieving a more positive movement of solids in the percolator set, i.e., extracting and recovering the more flavorful coffee solids in the fresh stages before they are moved back in the percolator set it is preferable to maintain temperatures in the fresh stage extraction column wherein the flavorful solids are not degraded. In general, this requirement is met by insuring that the coffee extract drawn off from the fresh stage extraction column is drawn off at temperatures below about 220° F. The temperature of the extraction liquid entering the fresh stage extraction column can easily be determined to result in such a draw-off temperature. Suitable intercolumn coolers may be employed according to methods well-known in the art to achieve this temperature profile if the aqueous extraction liquid does not undergo sufficient cooling as it passes through the successive columns of coffee.

Cycle times for this invention (defined as the time period between successive draw-offs of coffee extract from the fresh stage extraction column) will generally be in the order of 25-35 minutes and preferably between 30-35 minutes. However, where the split extraction technique as previously described is employed cycle times may be lower if short cycle times are employed in the fresh section to achieve the high extraction liquid velocities of this invention.

The utilization of high extraction liquid velocities in only the fresh stage extraction column is illustrated by the following table comparing operating conditions for a control pecolation run, a run employing high extraction liquid velocities throughout the percolator set (Sample II), and a run utilizing high extraction liquid velocities in the fresh stage extraction column only (Sample I) achieved via recycling a first portion of coffee extract drawn-off from the previous cycle. The numbers presented were averaged over a number of cycles.

As used in the context of this experiment, yield is defined as the weight of coffee solids in the drawn-off coffee extract divided by the weight of dry coffee solids in the fresh stage extraction column; concentration is the weight percent of coffee solids in the drawn-off coffee extract; and the drawoff factor is the weight of coffee extract drawn off over the dry weight of coffee in the fresh stage extraction column. Water was used as the aqueous extraction liquid fed to the spend stage extraction column. The percolator set comprised 5 extraction columns with freshly roasted and ground coffee contained in the fresh stage and progressively more extracted coffee in remaining columns down to the spent stage extraction column containing the most extracted coffee.

TABLE I

|  | CONTROL | SAMPLE I | SAMPLE II |
|---|---|---|---|
| Column Load, lbs. | 165 | 165 | 165 |
| Drawoff weight, lbs. | 254 | 254 | 254 |
| Drawoff Factor | 1.54 | 1.54 | 1.54 |
| Average Cycle Time, Mins. | 35.0 | 34.8 | 22.5 |
| Extract Superficial Velocity Ft./Min. | 0.45 | ~0.80 | 0.70 |
| Average Concentration, % | 26.0 | 25.9 | 25.9 |
| Average R & G Yield, % | 40.1 | 39.9 | 39.9 |
| Feedwater Temperature, ° F | 350° | 350° | 350° |
| Average Outlet Temperatures: |  |  |  |
| Spent Stage, ° F | 330° | 328° | 325° |
| IV Stage, ° F | 310° | 304° | 308° |
| III Stage, ° F | 260° | 255° | 250° |
| II Stage, ° F | 235° | 227° | 234° |
| Fresh Stage, ° F | 190° | 179° | 194 |

The true benefits of this invention can be seen by analysis of a material balance on the soluble solids around each extraction column. The difference in the weight of coffee soluble solids out of a particular extraction column and the weight of solids going into the same stage extraction column is divided by the weight of solids out of the fresh stage extraction column and expressed in terms of a percentage. The smaller the percentage, the less solids generated and/or recovered from the particular stage. A negative number indicates that fewer solids were contained in the extraction liquid exiting the particular stage than entered. This does not, of course, necessarily mean that no solids were generated in this stage. Rather, the phenomenon is a coaction between solids coming in to a particular stage being tied up by the bed of coffee and replaced to certain degrees by the new soluble solids generated in that particular stage. This is clearly borne out by the fact that even where a negative number was encountered across the fresh stage in some of the experimental runs using the process of this invention, the resulting coffee extract was found to contain many more fresh coffee flavor notes than the control samples.

The following table summarizes the results of such material balances for the experimental runs set forth in Table I, again averaging over several cycles at steady-state operation.

TABLE II

|  | (Percentage Solids) | | |
| --- | --- | --- | --- |
|  | CONTROL | SAMPLE I | SAMPLE II |
| FRESH STAGE | −41 | −21 | −18 |
| II STAGE | 32 | 27 | 26 |
| III STAGE | 13 | 3 | 8 |
| IV STAGE | 33 | 33 | 32 |
| SPENT STAGE EXTRACT | 63 | 58 | 52 |
| SUPERFICIAL VELOCITY, FT./MIN. | 0.45 | ~0.90 | 0.70 |

It can be readily seen that the control run results in a much poorer extraction and recovery of soluble coffee solids in the fresh stage than the experimental runs set out. As previously mentioned, this results in the available solids in the fresh stage not being recovered, if recovered at all, until the fresh bed of coffee has moved "back" in the percolator set in later cycles (note the recovery of solids in the spent stage of the control). At this point, these flavorful solids are exposed to more intensive heat and pressure treatment and are subject to flavor degradation. Hence the desirable flavor and aroma constituents of these solids are lost and the resulting coffee extract is accordingly less laden with these constituents.

On the other hand, the experimental runs according to the process of this invention indicate that the net effect of this process is to cause a more forward and more positive movement of coffee solids in the percolator set. Hence, there is more complete and efficient recovery of the fresh stage coffee solids at the reduced temperatures at which the fresh stage is extracted. The result, therefore, is that flavorful solids are extracted and recovered at conditions at which degradation is minimized and that the recovery of solids at these conditions prevents them from being subjected to higher temperature processing as they move back in the percolator set.

A comparison of Samples I and II indicates that these beneficial effects can be realized even if high extraction liquid velocities are utilized in the fresh stage extraction column only.

An expert flavor panel confirmed the results of these experiments, finding that both the experimental runs produced a coffee extract of excellent quality having more roasted and ground notes than the control sample and more flavor impact, and tasting more like freshly brewed coffee than the control sample.

While this invention has been described with respect to specific preferred embodiments, it is apparent that many variations of the process of this invention may be practiced without departing from the theme of this invention and the scope and spirit of the appended claims.

We claim:

1. In a process for producing coffee extract wherein progressively less extracted roasted and ground coffee is countercurrently contacted with an aqueous extraction liquid in the extraction columns of a percolator set, and wherein said aqueous extraction liquid is fed to the spent stage extraction column containing the most extracted coffee in the set and is drawn off as coffee extract from the fresh stage extraction column containing the least extracted roasted and ground coffee in the set, the improvement comprising utilizing a superficial velocity of aqueous extraction past the roasted and ground coffee of at least about 0.50 ft/min in less than all the extraction columns but including said fresh stage extraction column.

2. The process of claim 1 wherein said velocity is utilized in the fresh stage extraction column only.

3. The process of claim 2 wherein coffee extract is fed to said fresh stage extraction column with said aqueous extraction liquid to achieve said superficial velocity.

4. The process of claim 3 wherein said velocity is between 0.65 and 1.2 ft/min.

5. The process of claim 4 wherein said coffee extract drawn off from said fresh stage extraction column is below about 220° F.

6. The process of claim 1 wherein said velocity is utilized in the extraction columns comprising the fresh section of the percolator set.

7. The process of claim 6 wherein said extraction columns comprising said fresh section are maintained at an average temperature of below about 250° F.

8. The process of claim 7 wherein said velocity is between 0.65 and 1.2 ft/min.

9. In a split-percolation process wherein a percolator set is divided into an autoclave and fresh section and wherein a separate feed stream and drawoff are utilized in each section, the improvement comprising utilizing superficial extraction liquid velocities past the roasted and ground coffee of at least about 0.50 ft/min in said fresh section and less than about 0.40 ft/min in said autoclave section.

* * * * *

UNITED STATES PATENT AND TRADEMARK OFFICE
CERTIFICATE OF CORRECTION

PATENT NO. : 4,088,794

DATED : May 9, 1978

INVENTOR(S) : Saul N. Katz et al.

It is certified that error appears in the above-identified patent and that said Letters Patent are hereby corrected as shown below:

In column 4, Line 27, change "experience" to -- experiences --; line 33, change "valocities" to -- velocities --.

In column 5, line 47, delete "which" and insert -- within --.

In column 8, Table I, Sample I, opposite "Ft./Min.", delete "∼ 0.80" and insert -- ∼ 0.90 --.

Signed and Sealed this

Twenty-second Day of May 1979

[SEAL]

Attest:

RUTH C. MASON
Attesting Officer

DONALD W. BANNER
Commissioner of Patents and Trademarks